United States Patent [19]

Hinden

[11] Patent Number: 4,614,855

[45] Date of Patent: Sep. 30, 1986

[54] RESISTANCE WELD SECUREMENT DEVICE

[76] Inventor: Milton Hinden, Duro Dyne Corporation, Rte. #110, Farmingdale, N.Y. 11735

[21] Appl. No.: 608,355

[22] Filed: May 9, 1984

[51] Int. Cl.⁴ .............................................. B23K 11/32
[52] U.S. Cl. ..................................... 219/98; 219/86.9; 219/91.21
[58] Field of Search ................ 219/98, 99, 91.21, 86.9

[56] References Cited

U.S. PATENT DOCUMENTS

| | | | |
|---|---|---|---|
| 3,426,394 | 2/1969 | Poupitch | 219/99 X |
| 3,858,024 | 12/1974 | Hinden et al. | 219/98 |
| 3,975,611 | 8/1976 | Gordon | 219/98 |

*Primary Examiner*—C. L. Albritton
*Assistant Examiner*—Alfred S. Keve
*Attorney, Agent, or Firm*—Mark T. Basseches; Paula T. Basseches

[57] ABSTRACT

A weld attachment device and method are disclosed for effecting resistance welding connections through an insulating layer to a metallic substrate without necessarily having access to the rear surface of the substrate. The apparatus comprises a spaced parallel pair of weld pins supported on an electrical insulating carrier, the device being attached by advancing the tips of the pins into contact with a metal substrate and passing welding current through a circuit defined by the metal pins and the area of the substrate between the pins.

2 Claims, 3 Drawing Figures

RESISTANCE WELD SECUREMENT DEVICE

BACKGROUND OF THE INVENTION

1. Field of the Invention

The present invention is in the field of resistance weld attachment devices and is directed more particularly to an attachment device for securing insulating material, such as glass fiber batts to the surface of ductwork in order to minimize thermal losses in respect of air passed through the duct. The apparatus may likewise be employed for the fastening of other insulating materials to conductive ferrous substrates.

2. The Prior Art

It is known to minimize thermal losses in ducted installations by employing batts or sheets of insulating material to the interior or exterior of ducts. In typical applications the batts or sheets are glued to internal or external surfaces of the duct material.

In order to assure that the insulating material remains in attached position, it is standard practice to provide secondary securement means, such as, by way of example, an impact fastener having an enlarged head which bears against the surface of the insulation and a specially formed tip which couples to the substrate on impact.

More recently the use of impact fasteners has, by and large, been supplanted by resistance weld pins which likewise have an enlarged head portion and a sharpened tip. The pins are applied by passing the tip through the insulation and into contact with the substrate and causing a welding current to pass through the length of the shank, whereby the tip is melted and fuses with the material of the duct, dependably to anchor the pin in position.

Representative weld pins and methods of attaching the same are shown in U.S. Pat. Nos. 4,429,209 of Jan. 31, 1984 and 3,624,340 of Nov. 30, 1971. Apparatus for automatically welding such pins is shown in U.S. Pat. No. 3,835,285 of Sept. 10, 1974.

While the weld pins and devices of the cited patents have achieved substantial commercial success, in all instances they have required that the duct and batt be disposed atop one of the welding electrodes, normally the ground electrode of the resistance welding apparatus. Attachment is effected by supporting the head of the weld pin in electrical contact with the "live" electrode, the weld circuit, in such instances, running between the ground electrode which engages the duct or substrate, through the substrate shank and head of the welding pin, to the live electrode which engages the head.

As will be apparent from the preceding description, utilization of the resistance weld method has heretofore been possible only where it is readily feasible to engage the exposed surface of the metal substrate with a ground electrode at a position directly opposite the point of application of the weld pin. While such access is easily available when the ducting is being fabricated in a shop, for instance, it is often not feasible in the field to position a ground electrode directly behind the point of application of the weld pin, i.e. in the case of a pre-installed duct.

SUMMARY OF THE INVENTION

The present invention may be summarized as directed to an improved weld apparatus or pin structure which enables a resistance weld to be effected through a batt of insulating material or the like to a substrate without the requirement for access to the rear surface of the substrate.

More particularly, the present invention is directed to an apparatus and method for attaching insulating material to a substrate where the substrate is "buried" or inaccessible.

In accordance with the invention, the weld pin or apparatus comprises a pair of parallel pins mounted to or secured on an insulating spacer member. The pins include head portions extending to one side of the spacer and shanks passing through the spacer, which shanks terminate in co-planar aligned tips.

The device is used by contacting the head portion of one of the said pins with the live electrode and the head of the other said pin with the ground electrode of a welding apparatus. The device is advanced through the insulating material until the sharpened tips of the pins press against the substrate. Upon the application of a welding current to the weld electrodes, current flows through the circuit path defined between one electrode, the length of the shank of one of the pins, the area of the substrate between the contact points of the pins, and back through the shank of the second pin to the second electrode.

It will thus be perceived that resistance welds securing at least one of the pins may be effected without the necessity for positioning a ground electrode behind the point of application of the weld pin assembly.

It is accordingly an object of the invention to provide an improved weld attachment apparatus for attaching insulating materials to a surface of a substrate which does not require access to the rear surface of the substrate.

A further object of the invention is the provision of a method as described.

To attain these objects and such further objects as may appear herein or be hereinafter pointed out, reference is made to the accompanying drawings forming a part hereof, in which.

Figure 1:
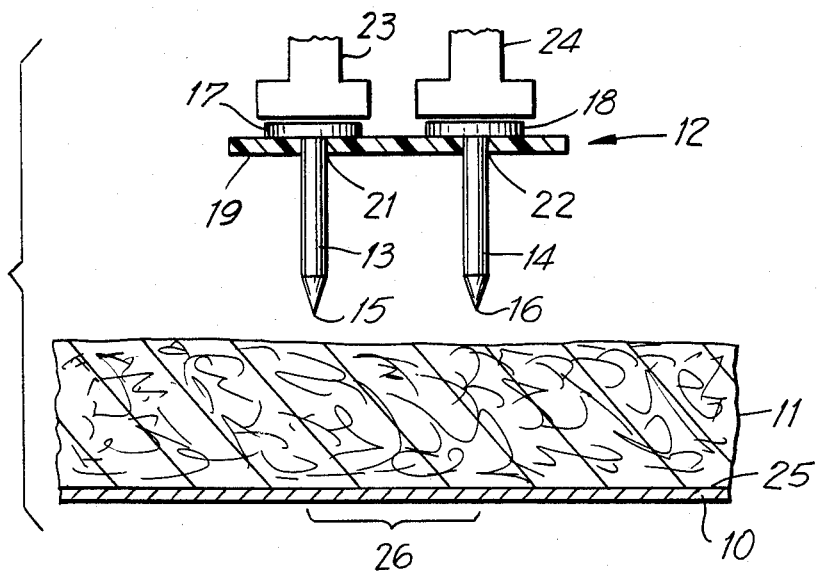
FIG. 1 is a diagrammatic vertical sectional view through a weld attachment apparatus of the type described, at an interim stage of attachment.

Referring now to the drawings, there is shown in FIG. 1 a substrate 10 which may be galvanized sheet metal or like material which is subject to being connected by welding to a ferrous weld pin. At 11 there is diagrammatically illustrated a layer or batt of insulating material.

It will be readily recognized from the ensuing description that the substrate 10, rather than comprising an increment of duct, may represent a sheet of metal affixed to a roof or siding of a building. Likewise, the insulating material 11 may comprise a waterproof covering, sheathing or like non-conductive insulating material.

The weld apparatus, which is illustrated generally at 12, includes a spaced parallel pair of weld pins 13, 14 which preferably are coextensive in lengthwise dimension, the pins including sharpened tip portions 15, 16, respectively, and enlarged head portions 17, 18, respectively.

The pins 13, 14 are supported in parallel spaced relation by a spacer member 19 which is fabricated of rigid insulating material which is preferably resistant to decomposition under heat. Any number of suitable insulating materials may be employed, a preferred such material being a phenol-impregnated fibrous mass.

The pins 13, 14 pass through and are frictionally retained in spaced parallel apertures 21, 22, respectively, in the spacer member 19, the heads 17, 18 projecting to the opposite side of the spacer from the tips 15, 16.

Electrodes 23, 24, shown diagrammatically in FIG. 1, of the resistance welding apparatus are contacted with the heads 17, 18 of the weld pins. Preferably the weld electrodes include magnetic means which support the ferrous head portion or portions of the pins in mounted position, as shown in FIG. 1.

The weld apparatus 12 is attached by advancing the apparatus through the batt, normally in a direction parallel to the shanks of the pins, until the tips 15, 16 engage against the upper surface 25 of the substrate 10. When this position is achieved, a welding current is caused to flow between the electrodes 23, 24, the current flowing in a current path which includes the heads and shanks of the pins 13, 14 and, in addition, the area 26 of the substrate which extends between the points of contact of the tips of the pins. Welding current continues to flow while pressure is exerted by the weld electrodes against the weld apparatus in the direction of the substrate.

As noted in the above referenced United States patents, the current flow continues for a timed period sufficient to permit melting of the sharpened tip portions of the pins, whereupon the pins are fused as by metal pools 27, which pools are formed in part by molten metal of the pins and in part by molten increments of metal of the substrate.

It is feasible to employ one weld pin of ferrous material which, when melted, will fuse to the substrate, and to employ as the other weld pin a metallic member of high conductivity, such as aluminum. This latter material will not bond or fuse to the metal substrate but has the advantage of significantly reducing the electrical resistance of the current path. Thus, where one aluminum weld pin is employed, it will be recognized that the entire holding forces which retain the apparatus in position will be supplied by the ferrous weld pin.

Figure 2:
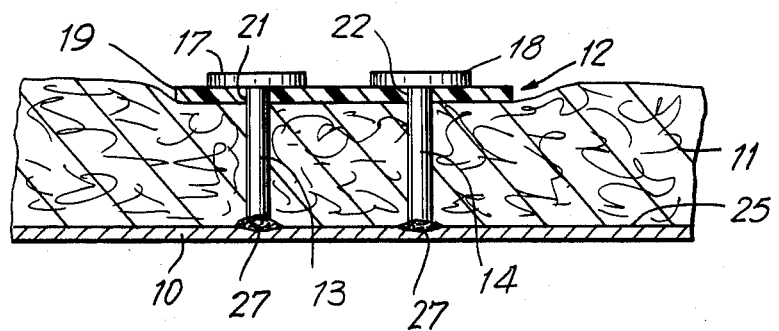
FIG. 2 is a view similar to FIG. 1 showing an attached apparatus in accordance with the invention.
Figure 3:
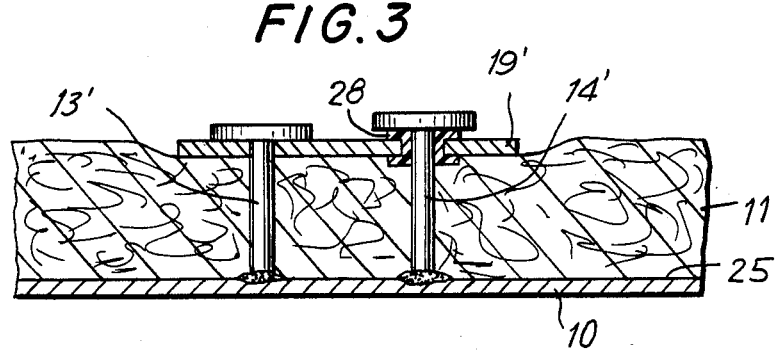
FIG. 3 is a view similar to FIG. 2 of an embodiment of the invention.

In FIG. 3 there is disclosed a weld apparatus which differs from that illustrated in FIGS. 1 and 2 in that the spacer member 19' is fabricated of conductive material and in that the weld pin 14' is electrically isolated from the spacer 19' by an insulating grommet 28.

In the apparatus of FIG. 3 it may be desirable for the weld pin 14' to be of greater length than the pin 13' by a distance which allows for the thickness of the grommet between the undersurface of the pin 14' and the upper surface of the spacer 19', whereby the tips of the pins are maintained in co-planar alignment.

From the foregoing it will be appreciated that there is described in accordance with the present invention a weld apparatus and method which enables the apparatus to be attached by resistance welding without the necessity for positioning a grounding electrode opposite the point of contact of the weld pins and substrate. The apparatus and method thus enable, for instance, insulating material to be applied to the outer surface of an existing installed duct assembly, an operation heretofore impossible since it is impractical to insert a ground electrode into the interior of a duct opposite the point of application of the weld apparatus.

It should be noted that application of a grounding electrode to the duct at a position remote from the point of application of the weld pin will not, as a practical matter, permit a resistance weld to be effected since the current path between the ground electrode and the weld pin would extend through such a large distance of the duct material that an unacceptably high resistance would be introduced into the welding circuit. Preferably in order to maintain the current path through the substrate at a minimum, the spacing between the tips of the weld pins should be retained at a low value, i.e. in the area of $\frac{1}{2}$ to $1\frac{1}{4}$".

Overheating of the conducting portion of the substrate is avoided by the fact that the principal resistance areas in the weld circuit, and, hence, the principal areas of voltage drop and heat concentration occur at the interface between the sharpened tip of the pins and the substrate since these are the areas of smallest cross-section.

As will be apparent to those skilled in the art and familiarized with the instant disclosure, numerous variations in details of construction may be made without departing from the spirit of the invention, which is therefore to be broadly construed within the scope of the appended claims.

Having thus described the invention and illustrated its use, what is claimed as new and is desired to be secured by Letters Patent is:

1. A resistance weld attachment apparatus adapted to be attached to a ferrous substrate through an intervening penetrable insulating blanket comprising, in combination, a first ferrous pin member, a second non-ferrous pin member formed of a metal having higher electrical conductivity than said first pin member, said members including elongate shank portions having sharpened tip portions at one end and enlarged head portions at the other end, a spacer member connected to said metallic members in the area between said head and shank portions and supporting the same in spaced parallel alignment with said head portions and said tip portions respectively in coplanar orientation, said spacer member including insulating members are mounted in electrical isolation one from the other.

2. Apparatus in accordance with claim 1 wherein said second pin comprises aluminum.

* * * * *